United States Patent [19]
Wardill et al.

[11] 3,814,464
[45] June 4, 1974

[54] TRAILER COUPLING MEANS
[75] Inventors: Gordon Agar Wardill, Cranfield; David Carl Taube, Purley; Alan Ananias Cornell, Frimley Green, all of England
[73] Assignees: Piggy-Back Tailer Rental Limited, London; Gordon Agar Wardill, Cranfield, both of, England
[22] Filed: Oct. 30, 1972
[21] Appl. No.: 301,749

[30] Foreign Application Priority Data
Nov. 3, 1971  Great Britain .................. 51136/71

[52] U.S. Cl. ............. 280/476 R, 280/444, 280/503
[51] Int. Cl. ............................................ B62d 53/00
[58] Field of Search ......... 280/476 R, 503, 408, 444

[56] References Cited
UNITED STATES PATENTS
2,450,215  9/1948  Wilson .................... 280/476 R X
2,458,666  1/1949  Williams .................... 280/476 R X
3,391,663  7/1968  Cagle et al. ................ 280/476 R X
3,717,364  2/1973  McClive .......................... 280/503 X Primary Examiner—Leo Friaglia
Attorney, Agent, or Firm—Brisebois & Kruger

[57] ABSTRACT

Arrangement for coupling a trailer drawgear to a towing road vehicle, in which a frame, arranged for pivotal connection with rear parts of the towing vehicle, carries at a rear part thereof a ball connector for receiving a socket connector secured on the trailer drawgear and below that ball connector a pair of steerable wheels, in which arrangement the wheels are steered by a lever pivoted on the frame and engaging in a steering device fixed on the trailer drawgear.

11 Claims, 10 Drawing Figures

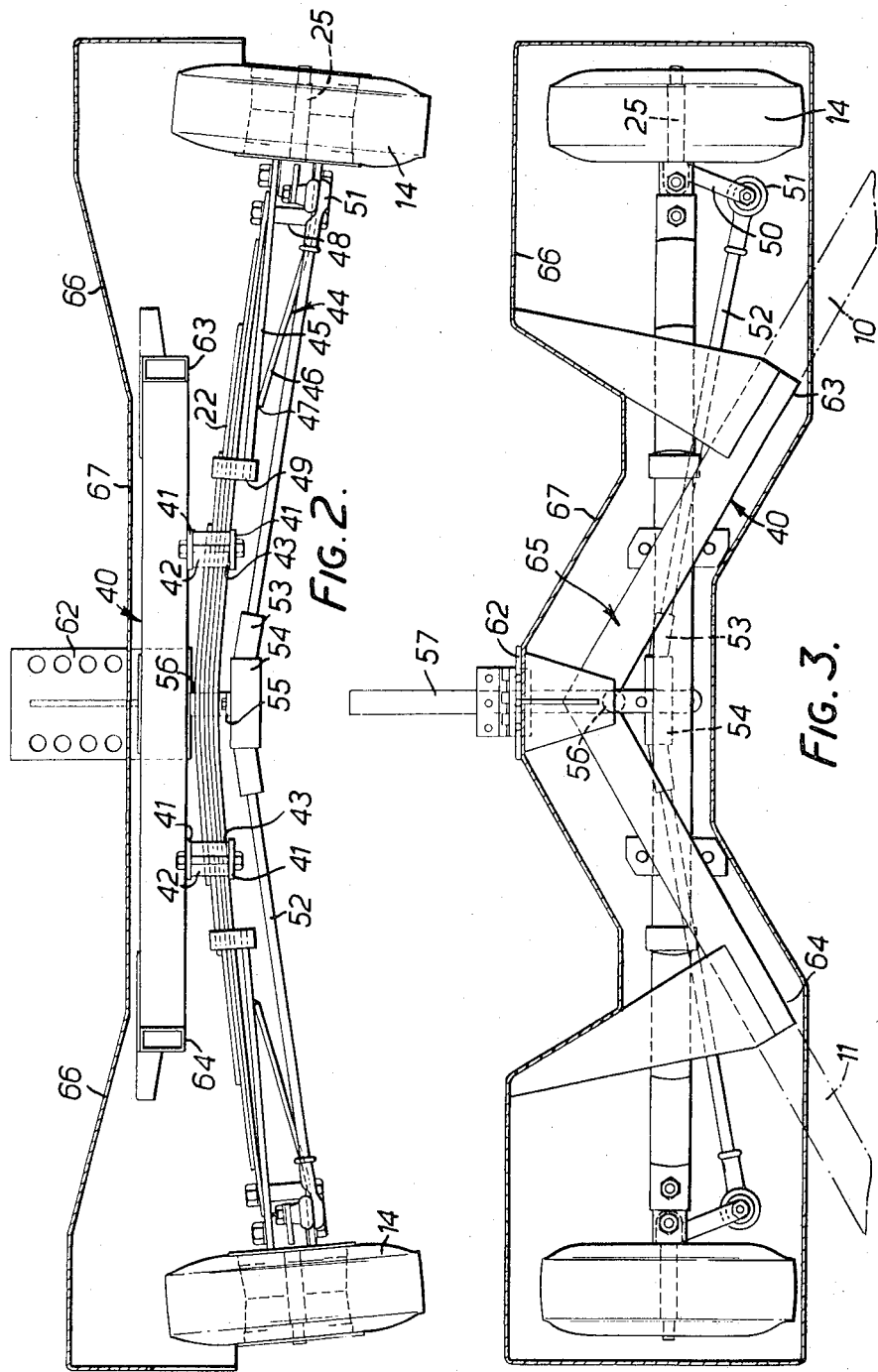

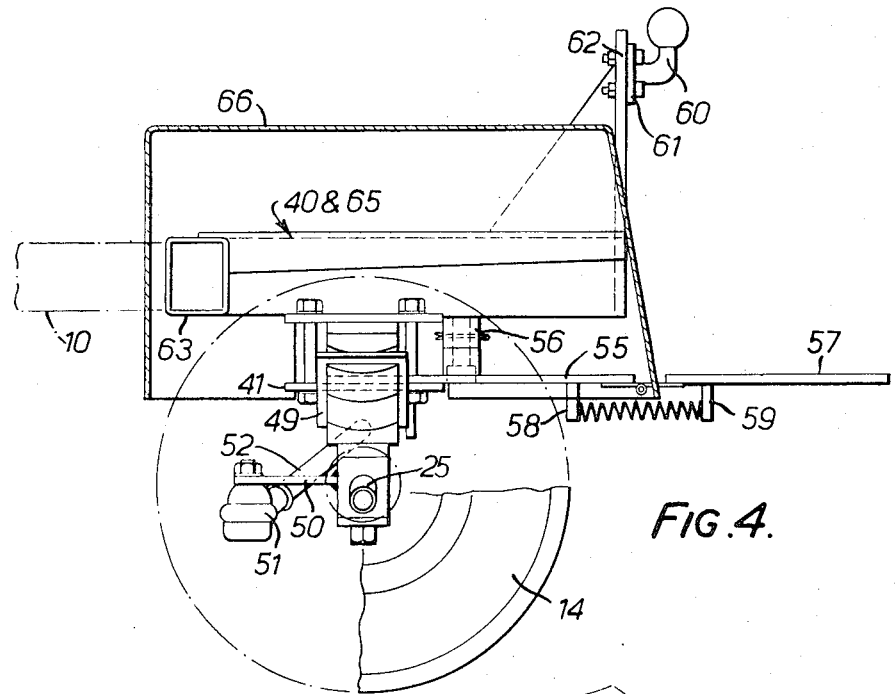
FIG. 4.
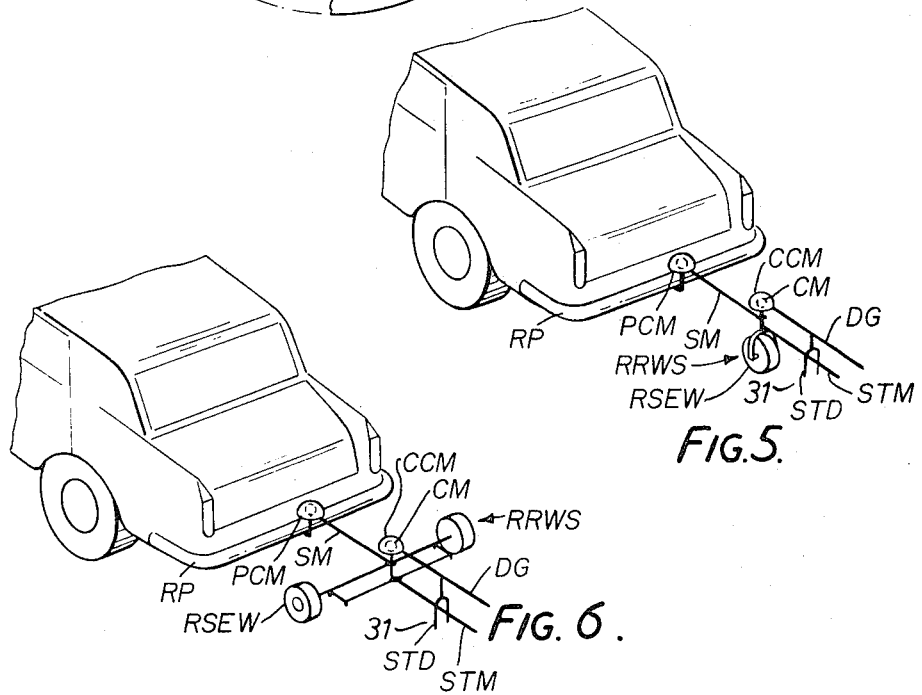
FIG. 5.
FIG. 6.

TRAILER COUPLING MEANS

This invention relates to trailer coupling means, that is to say, to coupling means for enabling a trailer to be coupled to a towing vehicle.

One simple form of such coupling means includes a coupling member secured on the rear of the towing vehicle, and a drawgear secured to the trailer and having a corresponding coupling member for enabling its leading end to be tractively connected to the said coupling member.

Another and more advantageous form of such coupling means includes a pair of side arms arranged for attachment to bearing members which are in turn secured on the wheel studs or bolts of the rear axle of the towing vehicle, the side arms extending rearwardly and transversely of the towing vehicle to join one another at a single towing part which has a coupling member, and a drawgear secured to the trailer and having a corresponding coupling member for enabling its leading end to be tractively connected to the said coupling member. An improved coupling means of this last-mentioned form is described in the complete specification of U.K. Pat. No. 1,265,482.

Such forms of coupling means have worked relatively satisfactorily for various forms of trailer in the past, but with larger and longer single-axle trailers problems arise which render the road performance of present forms of coupling means less satisfactory.

According to the present invention, a trailer coupling means includes a coupling member for receiving and supporting a corresponding coupling member secured to a drawgear of a trailer, a supporting means for supporting said coupling member at a predetermined distance behind a towing vehicle and having pivotal connecting means for enabling the supporting means to be pivotally connected with a rearward part of the towing vehicle, a road-running wheeled support carried by the supporting means beneath the coupling member end thereof and including at least one road surface-engaging wheel for providing support from the road surface for said coupling member and the leading end of a trailer drawgear when said cooperating coupling member is engaged with said coupling member, and a steering member pivotally carried on the supporting means and pivotally connected with the wheeled support whereby on engagement of the steering member with a steering device carried by said drawgear of a trailer the wheeled support is steered by the trailer in dependence upon its position relative to a vehicle towing the trailer.

Preferably, the wheeled support includes a pair of road surface-engaging wheels journalled at the respective ends of an axle which is itself carried on the supporting means at the coupling member end thereof so as to have freedom to pivot in effect in a plane transverse to the longitudinal towing axis of the trailer coupling means.

The respective road wheels may be rotatably carried on stub-shafts which are pivotally carried at the respective ends of the axle, in which case wheel steering means may be coupled with the respective stub-shafts and the steering member whereby on engagement of the steering member with a steering device carried by the said drawgear of a trailer the wheels are steered by the trailer in dependence upon its position relative to a vehicle towing the trailer.

Advantageously, the axle may comprise a leaf spring centrally mounted in a pivotal manner on the supporting means at a position beneath the coupling member end thereof, and carrying at its respective ends the respective road surface-engaging wheel, and damping means may be arranged to engage the axle in a frictional manner whereby to damp pivotal movement of the axle.

According to another aspect of the present invention, the said pivotal connecting means comprises a single connection device for providing pivotal connection with a rearward part of a towing vehicle at one position thereon, though in a preferred arrangement the said pivotal connecting means comprises two connection devices for providing pivotal connection with a rearward part of a towing vehicle at two transversely-spaced positions thereon.

The supporting means may conveniently comprise a frame having two arms joined together at the said end carrying the said coupling member, the arms diverging from that end and carrying at their respective free ends the respective connection devices for providing pivotal connection with a rearward part of a towing vehicle at the said two transversely-spaced positions respectively. The free ends of the diverging arms may have parallel terminal portions on which are rotatably mounted wheel-coupling plates arranged for securing adjacent the respective rear wheels of a towing vehicle.

Advantageously, the said coupling member forms together with its said corresponding coupling member on the drawgear of a trailer a ball and socket coupling.

One trailer coupling embodying the present invention, and an improved version thereof, will now be described by way of example and with reference to the accompanying drawings in which:

FIGS. 2, 3 and 4 show the main parts of the improved form of trailer coupling, FIG. 2 showing a front elevation as seen from a towing vehicle, FIG. 3 showing a plan view, and FIG. 4 showing a side view; and FIGS. 5 to 10 showing schematically various configurations of trailer couplings embodying the present invention.

Figure 1:
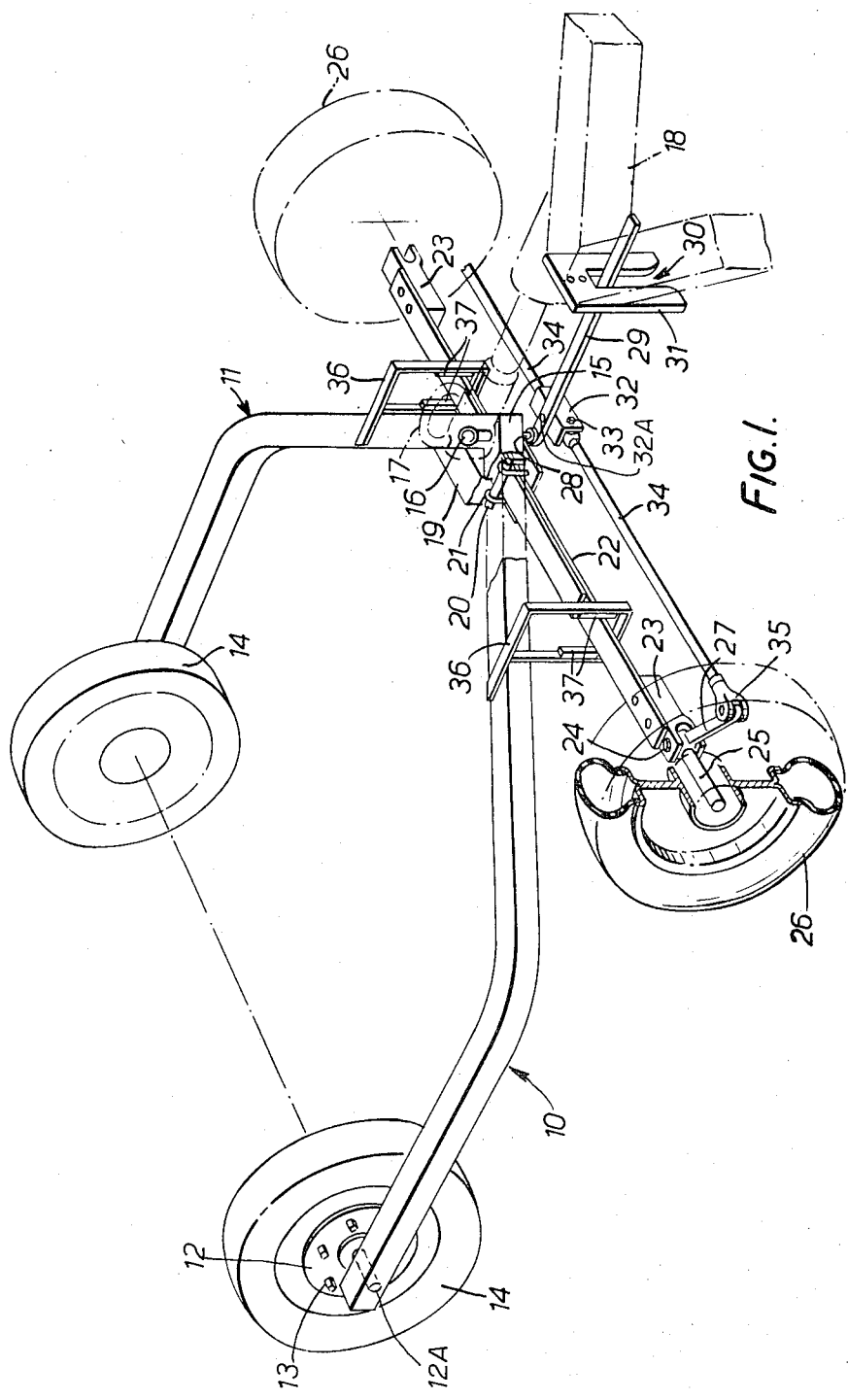
FIG. 1 shows the coupling in perspective with appropriate parts sectioned and/or omitted to enable other parts to be seen.

Referring now to the drawings:

The coupling includes a frame comprising two side arms generally shown at 10 and 11 which extend rearwardly from wheel plates 12 secured on extended wheel studs 13 which hold the rear wheels 14 of a towing vehicle in place on the rear axle thereof. These arms pass obliquely behind the towing vehicle and are joined together at an apex or towing part 15. The wheel plates 12 are rotatably carried on bearings which engage with stub shafts 12A secured on the parallel parts of the side arms.

The coupling so far described may be constructed in the manner already described in detail in the complete specification of our U.K. Pat. No. 1,265,482 to which the reader is referred for further information.

The towing part 15 carries an upstanding ball connector 16, constituting the said coupling member, which engages when in operation in a handled towing socket 17, constituting the said corresponding coupling member, carried at the front end of a trailer drawgear 18, which is shown in chain-dotted form for ease of representation of other parts.

The oblique or diverging parts of the side arms 10 and 11 have welded thereto just in front of the towing part 15 an inverted transverse channel member 19 in which is journalled a bearing pin 20. This pin has supporting means secured thereto by stirrup bolts 21 said supporting means comprises a transverse axle 22 constituted by a leaf spring assembly. Bearing lugs 23 fixed to the respective ends of the leaf spring assembly carry vertical bearing pins 24 on which are pivotally mounted road running wheeled supports in the form of stub shafts 25 for two road wheels 26. Each stub shaft 25 is provided with a rearwardly inclined steering arm 27.

Secured to the towing part 15 directly beneath the ball connector 16 is a vertical spindle 28 on which is pivotally carried a rearwardly extending steering lever 29. This lever is arranged to enage in an open-ended vertical slot 30 formed in a steering device 31 which is secured on the front part of the trailer towing structure 18.

A short transverse angle member 32 is pivotally secured at 32A beneath the steering lever at a short distance rearwardly of the vertical spindle 28 and this angle member carries two transversely-spaced forwardly-extending bearing pins 33 on which are journalled two steering rods 34 for angular movement in the vertical plane. The other ends of the steering rods carry slotted lugs 35 in which the free ends of the steering arms 27 are pivotally secured for movement in a horizontal plane.

Rectangular frames 36 encircling the respective sides of the leaf spring assembly are secured on the rear oblique parts of the side arms 10 and 11. These frames carry vertical rubbing surfaces 37 which engage the forward and rear surfaces of the leaf spring assembly to provide means for resisting fore-and-aft loads exerted on the road wheels, and means for damping vertical movement of the road wheels. The upper and lower horizontal members of each frame provide means for limiting the vertical displacement of the road wheels relative to the side arms 10 and 11.

In operation the bearing pin 20 enables rotation (i.e. rolling) of the leaf spring assembly and associated parts about the longitudinal towing axis of the coupling relative to the side arms 10 and 11 and the rear wheels of the towing vehicle. This rotation is limited, guided and damped by the frames 36.

The wheels are steered by the trailer through the slotted device 31 which appropriately displaces the engaging end of a steering member in the form of a lever 29, which in turn displaces the steering rods 34 transversely to steer the two wheels 26. The steering geometry is arranged to provide correct wheel angle relative to the dispositions of the towing vehicle and trailer.

The engagement of the steering lever 29 with the slotted device 31 is such that firstly the steering mechanism is readily and automatically coupled and uncoupled from the trailer, and secondly that the normal overrun-initiated braking action is not impeded.

By means of the wheeled support provided at or near the point of attachment of the coupling to the trailer drawgear the coupling is constrained against excessive downward movement of the coupling side arms so that no vertical loads can be applied by the trailer to the rear wheels and axle of the towing vehicle. Furthermore, the tendency of the trailer to pitch about its single road-wheel axle is greatly reduced so that towing may be more safely carried out at greater speeds than heretofore. By making the wheeled support steerable (as opposed to freely castoring), the tendency for the trailer to "snake" along the road is reduced.

Whereas in the above embodiment the wheeled support includes two wheels mounted at the ends of a transverse axle the wheeled support may alternatively comprise a single steerable wheel mounted beneath the ball connector.

In place of the resilient axle there may be provided a rigid axle having appropriate resilient mounting to ensure smooth riding of the coupling.

Other forms of damping for the axle may be provided in place of the frictional damping described above.

Referring now to the improved form of trailer coupling shown in the FIGS. 2 to 4, parts which are common to both the original and improved forms of coupling have references already used for those parts in FIG. 1.

The improved trailer coupling is generally similar in organization and operation to the original coupling described with reference to FIG. 1, but has various features which provide either a cheaper construction or an enhanced road performance.

The modified features are as follows:

The leaf spring assembly 22 is now more rigidly (though resiliently) supported in a pivotal manner on the frame 40, by means of clamps 41 which secure the spring assembly through rubber buffers 42 and 43.

The bearing lugs 23 of FIG. 1 are replaced by equivalent devices 44 formed from strips of steel 45 and 46 welded together at 47 and secured at the respective ends of the spring assembly by fixing bolts which carry tubular spacers 48. Steel bands 49 secured to the free ends of the steel strips 45 loop around intermediate parts of the spring assembly.

Each stub-shaft 25 is provided with a forwardly inclined steering arm 50 which is coupled at its free end by a ball and socket connector 51 to a steering rod 52. The inner ends of the steering rods 52 are connected by a flexible member 53 (e.g. a piece of armoured rubber hose) in a socket 54 which is in turn secured to the underside of a steering lever 55 forwardly of its own pivotal mounting 56.

The rearward part 57 of the steering lever 55, which is arranged to engage in the vertically-slotted steering device 31 carried by the trailer drawgear, is hinged relative to the rest of that lever, and is urged upwardly in the slotted steering device 31 by a compression spring carried between abutments 58 and 59 beneath the steering lever.

The upstanding ball connector 16 of FIG. 1 is replaced by a similar upstanding ball connector 60 carried on a vertical plate 61, this plate being bolted to an upright mounting plate 62 secured on the apex part of the frame 40. This mounting plate is provided with a series of fixing holes for enabling the position of the ball connector to be adjusted to different heights.

The side arms 10 and 11 of the frame 40 are adjustably secured in tubular sockets 63, 64 formed in the free ends of an apex part 65 of the frame. Mud-guards 66 cover the wheels 14 and are joined by a transverse casing part 67.

Figure 9:
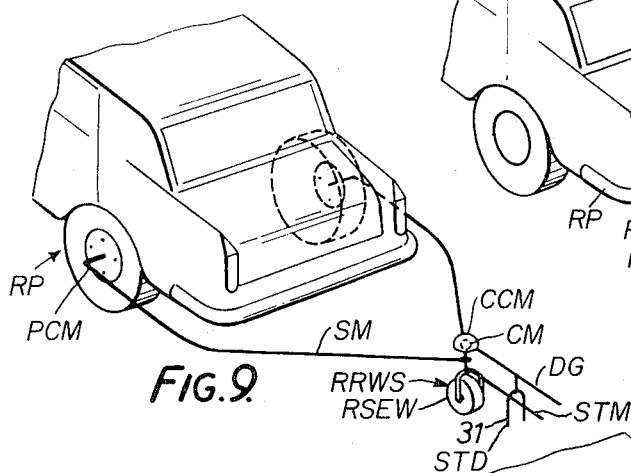
Figure 10:
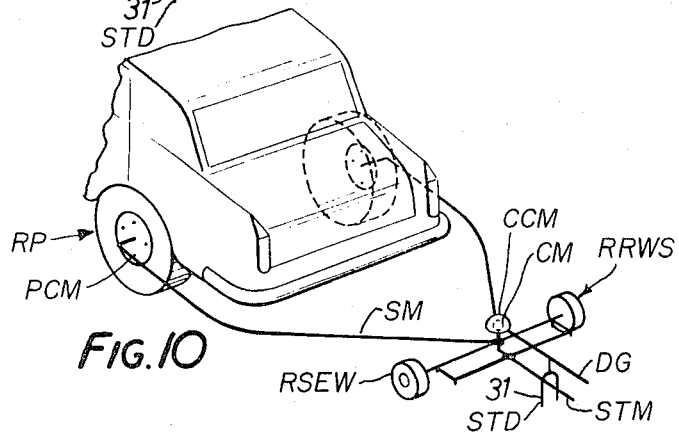

Other practical forms of trailer coupling embodying the present invention are shown schematically in the FIGS. 5 to 9; to aid in understanding these arrangements the FIG. 10 shows the trailer coupling described with reference to FIG. 1 in the same schematic manner.

Figure 7:
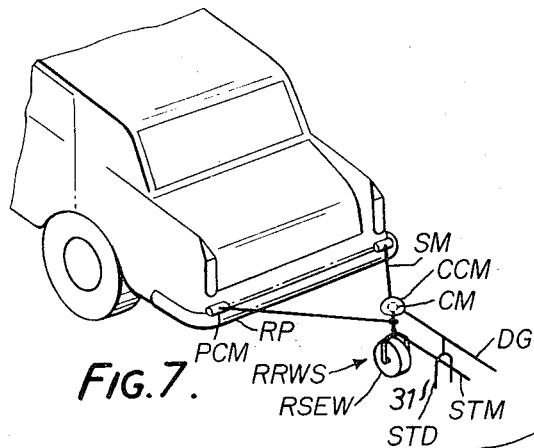
Figure 8:
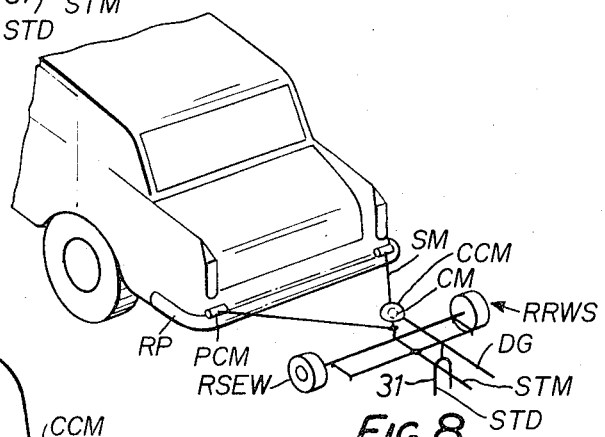

FIGS 5, 7 and 9 show couplings having a single steerable wheel, steering being effected by the slotted steering device 31 carried on the trailer drawgear; while FIGS. 6 and 8 show couplings having two steerable wheels, likewise steered by the slotted device 31.

FIGS. 5 and 6 show couplings in which the wheeled support is drawn by a single link member pivotally coupled to a single rearward part of the towing vehicle bodywork.

FIGS. 7, 8 and 9 show couplings in which the wheeled support is drawn by a two-armed frame which is pivotally coupled to two rearward parts of the towing vehicle, the couplings of FIGS. 7 and 8 being pivotally connected to two rearward parts of the towing vehicle bodywork, and that of FIG. 9 being coupled to the rear wheels of the towing vehicle, as is also the case for the coupling of FIG. 10.

The trailer couplings described above are designed so that deflection of the steering lever 29 or 55 by the slotted steering device 31 from the central position will produce a corresponding steering action of the road wheels 26. However, if desired the steering means may be so arranged that deflection of the steering lever in a small central range will produce no or no substantial steering action of the wheels, whilst further deflection of the steering lever outside that central range will produce an appropriate steering action.

Referring to the arrangements shown in the FIGS. 5 to 10, various items have been referenced therein as follows so as to generally indicate their correspondence with parts identified by the following terms which are used in the claims that follow hereafter:

| | |
|---|---|
| coupling member | CM |
| corresponding coupling member | CCM |
| drawgear of a trailer | DG |
| supporting means | SM |
| pivotal connecting means | PCM |
| rearward part of a towing vehicle | RP |
| road-running wheeled support | RRWS |
| road-surface engaging wheel | RSEW |
| steering member | STM |
| steering device | STD |

We claim:
1. Coupling means for enabling a trailer to be coupled to a towing vehicle including
   a coupling member for receiving and supporting a corresponding coupling member secured to a drawgear of a trailer,
   a supporting means for supporting said coupling member at a predetermined distance behind a towing vehicle and having pivotal connecting means for enabling the supporting means to be pivotally connected with a rearward part of the towing vehicle,
   a road-running wheeled support carried by the supporting means beneath the coupling member end thereof and including at least one road surface-engaging wheel for providing support from the road surface for said coupling member and the leading end of a trailer drawgear when said cooperating coupling member is engaged with said coupling member, and
   a steering member pivotally carried on the supporting means and pivotally connected with the wheeled support whereby on engagement of the steering member with a steering device carried by said drawgear of a trailer the wheeled support is steered by the trailer in dependence upon its position relative to a vehicle towing the trailer.

2. Trailer coupling means according to claim 1, wherein said pivotal connecting means comprises a single connection device for providing pivotal connection with a rearward part of a towing vehicle at one position thereon.

3. Trailer coupling means according to claim 1, wherein said pivotal connecting means comprises two connection devices for providing pivotal connection with a rearward part of a towing vehicle at two transversely-spaced positions thereon.

4. Trailer coupling means according to claim 3, wherein the supporting means comprises a frame having two arms joined together at said end carrying said coupling member, the arms diverging from that end and carrying at their respective free ends the respective connection devices for providing pivotal connection with a rearward part of a towing vehicle at said two transversely spaced positions respectively.

5. Trailer coupling means according to claim 4, wherein said free ends of the diverging arms have parallel terminal portions on which are rotatably mounted wheel-coupling plates arranged for securing adjacent the respective rear wheels of a towing vehicle.

6. Trailer coupling means according to claim 5, wherein the wheeled support includes a pair of road surface-engaging wheels journalled at the respective ends of an axle which is itself carried on the supporting means at the coupling member end thereof so as to have freedom to pivot in effect in a plane transverse to the longitudinal towing axis of the trailer coupling means.

7. Trailer coupling means according to claim 6, wherein the respective road wheels are rotatably carried on stub-shafts which are pivotally carried at the respective ends of the axle, and including wheel steering means coupled with the respective stub-shafts and with the steering member whereby on engagement of the steering member with a steering device carried by said drawgear of a trailer the wheels are steered by the trailer in dependence upon its position relative to a vehicle towing the trailer.

8. Trailer coupling means according to claim 7, wherein the axle comprises a leaf spring centrally mounted in a pivotal manner on the supporting means at a position beneath the coupling member end thereof, and carrying at its respective ends the respective road surface-engaging wheel.

9. Trailer coupling means according to claim 8, wherein the supporting means carries damping means arranged to engage the axle in a frictional manner whereby to damp pivotal movement of the axle.

10. Trailer coupling means according to claim 9, wherein said coupling member forms together with said corresponding coupling member on the drawgear of a trailer a ball and socket coupling.

11. Trailer coupling means according to claim 7, wherein the steering member comprises a lever pivotally mounted at a position below the position of said coupling member and extending in a trailing direction whereby to engage in a slot formed in said steering device and having an open lower end, so that uncoupling of the trailer drawgear from the trailer coupling means may be effected by lifting the leading end of the trailer drawgear in an upward direction, said steering means comprising at least one link member pivotally connecting the stub-shafts with said lever at a position adjacent its pivotal mounting position.

* * * * *